US011280635B2

(12) United States Patent
Houser et al.

(10) Patent No.: US 11,280,635 B2
(45) Date of Patent: Mar. 22, 2022

(54) TOOLING SENSING AND CALIBRATION APPARATUS AND METHOD

(71) Applicant: TE Connectivity Services GmbH, Schaffhausen (CH)

(72) Inventors: Matthew Steven Houser, Hummelstown, PA (US); Rodney Spade, Elizabethtown, PA (US); Gary L. Deck, Bethel, PA (US); Christopher John Gavlak, Mechanicsburg, PA (US); Michael Morris, Harrisburg, PA (US); Thomas Emery Backenstoes, Harrisburg, PA (US)

(73) Assignee: TE Connectivity Services GmbH

( * ) Notice: Subject to any disclaimer, the term of this patent is extended or adjusted under 35 U.S.C. 154(b) by 177 days.

(21) Appl. No.: 16/667,228

(22) Filed: Oct. 29, 2019

(65) Prior Publication Data

US 2021/0123773 A1 Apr. 29, 2021

(51) Int. Cl.
*G01D 5/14* (2006.01)
*H02G 1/12* (2006.01)

(52) U.S. Cl.
CPC ............... *G01D 5/14* (2013.01); *H02G 1/127* (2013.01); *H02G 1/1253* (2013.01)

(58) Field of Classification Search
CPC ......... G01D 5/14; H02G 1/1253; H02G 1/127
See application file for complete search history.

(56) References Cited

U.S. PATENT DOCUMENTS

| 4,993,287 A | 2/1991 | Carpenter | |
|---|---|---|---|
| 7,152,513 B2 * | 12/2006 | Palmowski | H02G 1/1265 83/13 |
| 2016/0054251 A1 * | 2/2016 | Deschler | H02G 1/1248 81/9.51 |
| 2018/0090918 A1 * | 3/2018 | Houser | H02G 1/1265 |

FOREIGN PATENT DOCUMENTS

| CN | 206211255 U | * 5/2017 |
| JP | H03293916 A | 12/1991 |
| JP | 3133454 B2 | 2/2001 |

OTHER PUBLICATIONS

English machine translation of Chinese utility model CN206211255U; by Wang Bin et al., published May 31, 2017 (Year: 2017).*
International Search Report, International Application No. PCTIB2020/ 060103, International Filing Date Oct. 28, 2020.

* cited by examiner

*Primary Examiner* — Walter L Lindsay, Jr
*Assistant Examiner* — Geoffrey T Evans

(57) ABSTRACT

A method and apparatus to verify that proper tooling has been installed in a cable preparation apparatus and/or to calibrate the tooling prior to running the cable preparation apparatus with a cable inserted therein. The method includes: inserting a reference device between blades of the cable preparation device; moving the blades inward toward the reference device until the blades engage the reference device; collecting data to determine when the blades engage the reference device; and comparing the collected data of the blades to an expected range of data of the reference device, wherein if the collected data of the blades does not conform (Continued)

to the expected range of data of the reference device the tooling is not validated, and the apparatus alerts the user.

15 Claims, 6 Drawing Sheets

TOOLING SENSING AND CALIBRATION APPARATUS AND METHOD

FIELD OF THE INVENTION

The present invention is directed to an apparatus and a method for a cable preparation machine apparatus which verifies that the proper tooling is installed and calibrated prior to the operation of the apparatus. In particular, the invention is directed to a process to detect the presence of and calibrate blades in a cable preparation machine.

BACKGROUND OF THE INVENTION

Cable preparation machines typically involve some level of tooling changeover when changing cable sizes, or when the tooling wears out. This changeover is usually a manual process that relies on a user to install the correct tooling using the correct methods. The potential issues involved in the changeover process include installing the incorrect tooling, failing to install some or all of the tooling, having a mix of correct and incorrect tooling, and having differences in tooling locations due to tolerance stack-ups. These issues could cause tooling crashes or poor quality on cable preparations.

There is a need for a method to have the cable preparation machine ensure the proper tooling is installed before the machine runs. There is also a need to have the machine automatically calibrate the blade positions after each tooling installation.

SUMMARY OF THE INVENTION

An object is to provide a process of monitoring current and position on motors while pushing the blades onto a mandrel with a known diameter to verify that the proper tooling is used and to calibrate the tooling.

An embodiment is directed to a method to verify that proper tooling has been installed in a cable preparation apparatus prior to running the cable preparation apparatus with a cable inserted therein. The method includes: inserting a reference device between blades of the cable preparation device; moving the blades inward toward the reference device until the blades engage the reference device; collecting data to determine when the blades engage the reference device; and comparing the collected data of the blades to an expected range of data of the reference device, wherein if the collected data of the blades does not conform to the expected range of data of the reference device the tooling is not validated, and the apparatus alerts the user.

An embodiment is directed to a method to calibrate the positioning of tooling in a cable preparation apparatus prior to running the cable preparation apparatus with a cable inserted therein. The method includes: i) inserting a reference device between blades of the cable preparation device; ii) moving the blades inward toward the reference device until the blades engage the reference device; iii) collecting data to determine when the blades engage the reference device; iv) moving the blades away from the reference device; v) repeating steps ii), iii) and iv) at least once; vi) averaging the data collected; and vii) recording the average collected data to calibrate the blades.

An embodiment is directed to a cable preparation apparatus. The apparatus includes a blade control mechanism with a center opening. Blade control arms are pivotally mounted on the blade control mechanism. Blades are mounted to the blade control arms. A mandrel is movably mounted to extend into the center opening and extend between the blades of the blade control arms. A first drive mechanism is provided. A first drive wheel cooperates with the first drive mechanism. The first drive wheel extends between the first drive mechanism and a first drive motor. A second drive mechanism is spaced from but in line with the first drive mechanism. A second drive wheel cooperates with the second drive mechanism. The second drive wheel extends between the second drive mechanism and a second drive motor.

An embodiment is directed to a method of developing a cable preparation sequence for a cable preparation apparatus. The method includes: placing a prepared cable in a first position in the cable preparation apparatus, the prepared cable being in a post-stripped condition; moving blades of the cable preparation apparatus until a first section of the prepared cable is contacted by the blades, defining a first position of the blades; recording the position of the blades when the blades are in the first position; retracting the blades from the first position; moving the prepared cable to a second position in the cable preparation apparatus; moving the blades of the cable preparation apparatus until a second section of the prepared cable is contacted by the blades, defining a second position of the blades; recording the position of the blades when the blades are in the second position; and creating the cable preparation sequence for the cable preparation apparatus using the recorded first position of the blades and the recorded second position of the blades.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
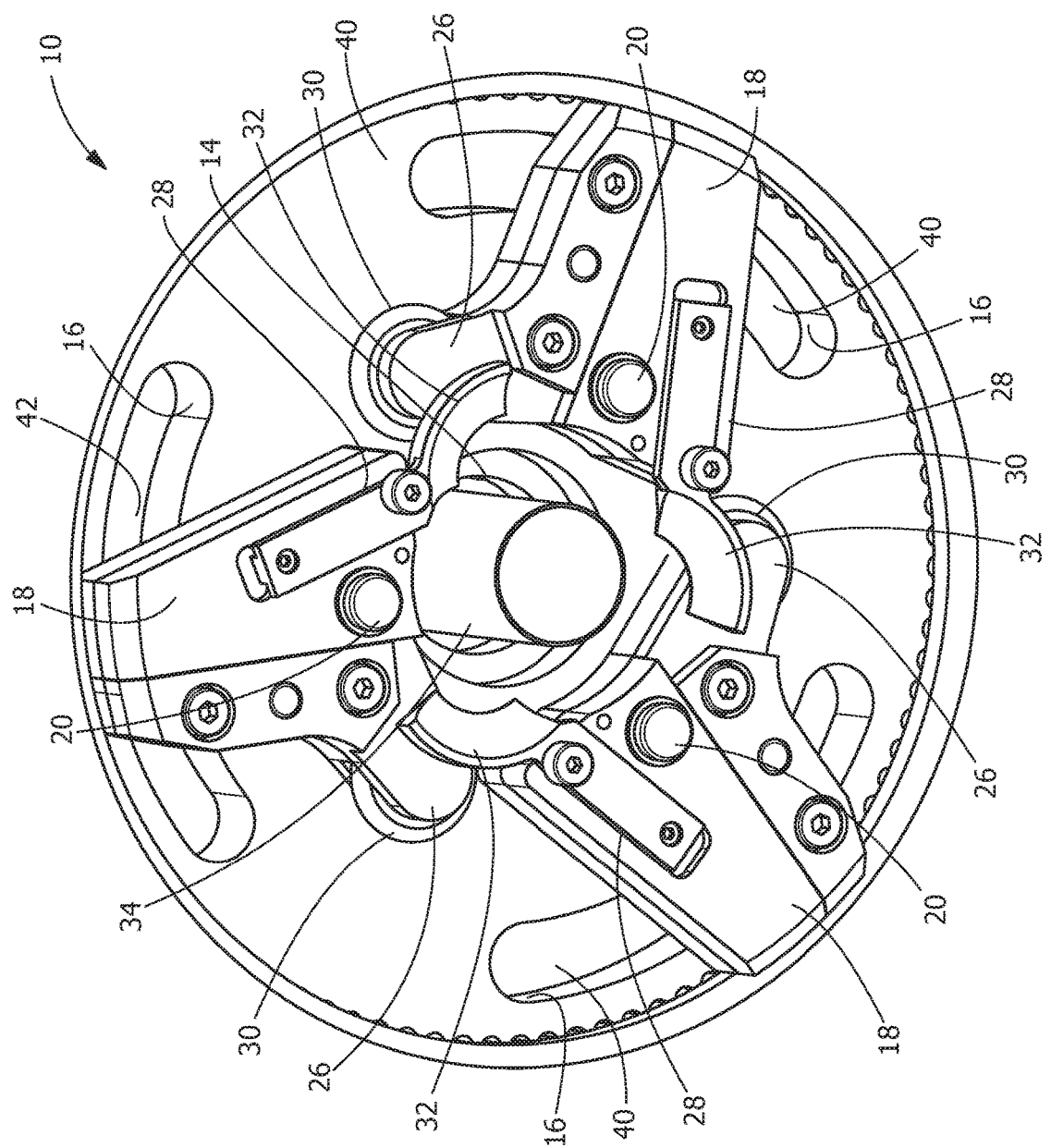
FIG. 1 is a perspective front view of an illustrative cable preparation apparatus according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIG. 1, a cable stripping or preparation apparatus 10 has front drive wheel 40 of a circular blade control mechanism 12 (FIG. 2) which has a center opening 14 and arcuate slots 16 positioned proximate the circumference of the front drive wheel 40 of the circular blade control mechanism 12. In the illustrative embodiment shown, three arcuate slots 16 are provided.

Blade control arms 18 are mounted on the blade control mechanism 12. Mounting members 20 extend through the blade control arms 18 to a second drive mechanism or drive wheel 42 of the blade control mechanism 12. The mounting members 20 pivotally mount the blade control arms 18 to the blade control mechanism 12 to allow the blade control arms 18 to move or pivot relative to the front drive wheel 40 of the blade control mechanism 12. Each blade control arm 18 has a wheel mounting device (not shown) which extends through the respective slot 16 to mount to the second drive wheel or mechanism 42.

Each blade control arm 18 has a round wheel or braid cutting wheel mounting portion 26 and a contoured or insulation cutting blade mounting portion 28. As shown in FIG. 1, a round wheel or braid cutting wheel 30 is mounted in the round wheel mounting portion 26 and a contoured or insulation cutting blade 32 is mounted in the contoured blade mounting portion 28. The braid cutting wheel 30 is mounted to allow the braid cutting wheel 30 to spin or rotate relative to the round wheel mounting portion 26. The insulation cutting blade 32 is fixedly mounted to the contoured blade mounting portion 28.

In the position shown in FIG. 1, a reference device or mandrel 34 is positioned in the center opening 14 of the blade control mechanism 12. The diameter of the mandrel 34 is configured to correspond to a cable which is to be prepared in the cable preparation apparatus 10, as will be more fully described. The mandrel 34 is movable between the extended position shown in FIG. 1, in which the mandrel 34 extends through the opening 14 and resides between the blade control arms 18, and a retracted position, in which the mandrel 34 is backed out of the opening 14, such that the mandrel 34 is not positioned in the opening 14 or between the blade control arms 18.

Figure 2:
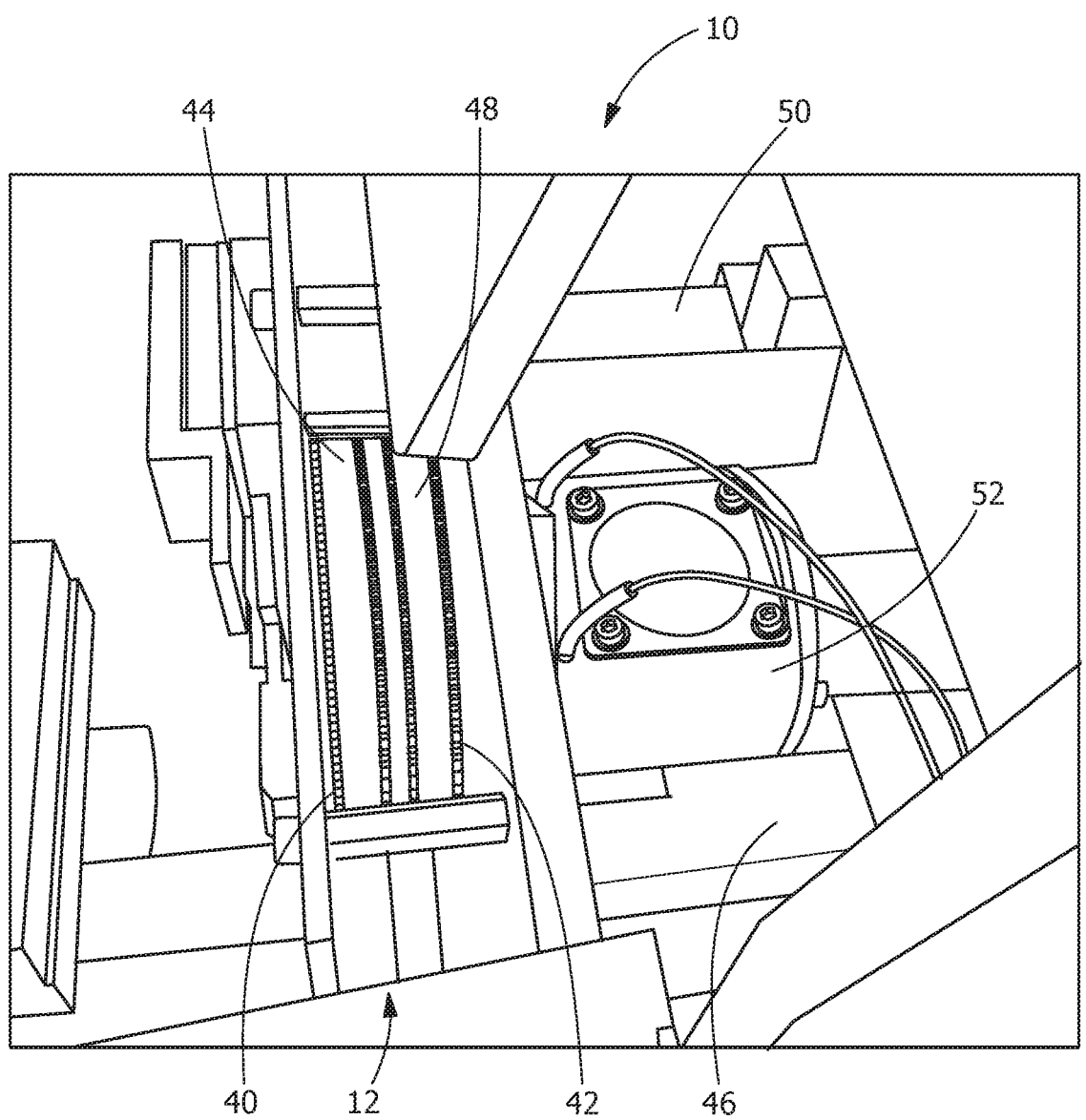
FIG. 2 is a perspective side view of the cable preparation apparatus of FIG. 1.
Figure 3:
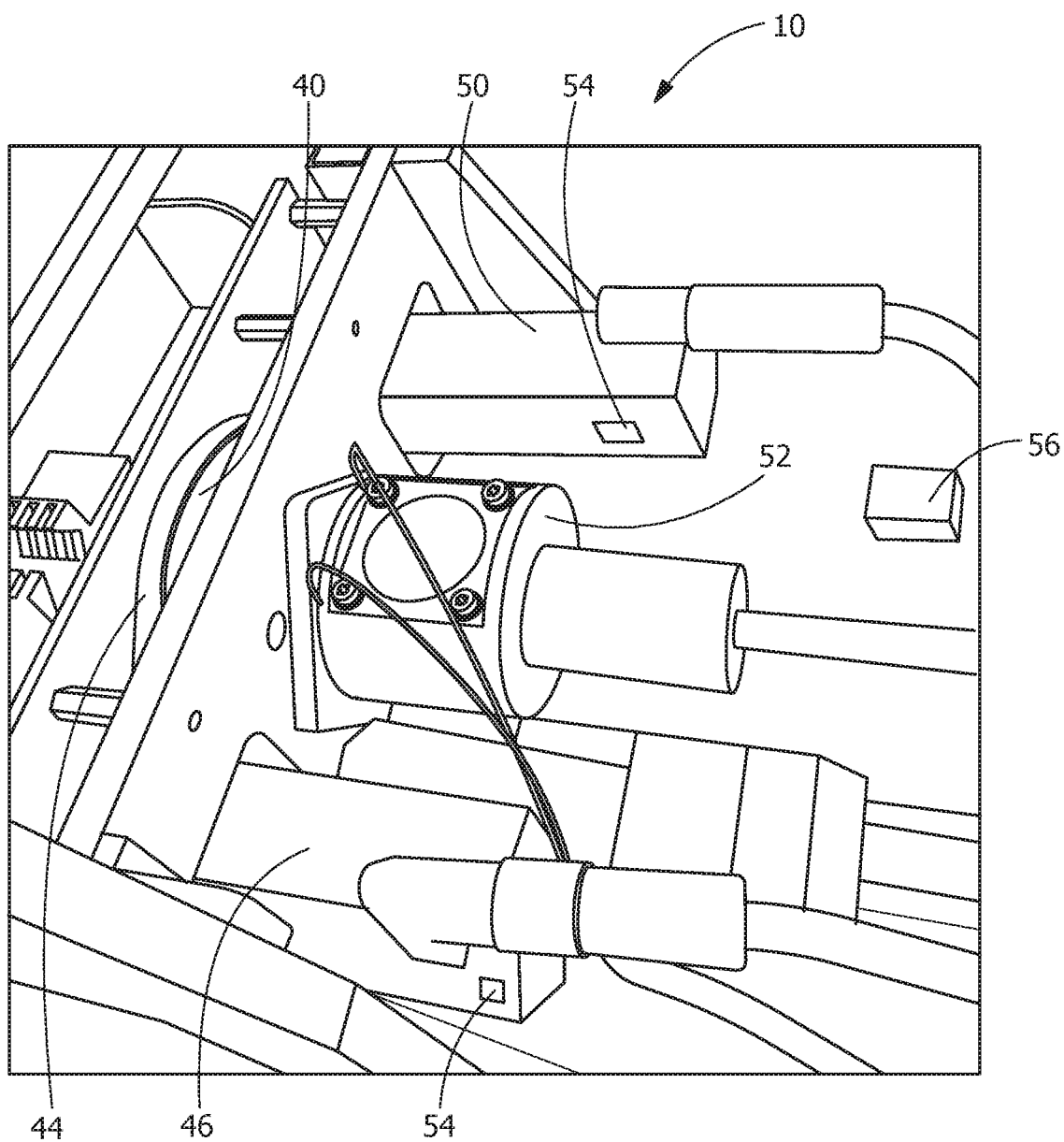
FIG. 3 is a perspective rear view of the cable preparation apparatus of FIG. 1.

Referring to FIGS. 2 and 3, cable preparation apparatus 10 has a first drive mechanism or drive wheel 40 and a second drive mechanism or drive wheel 42 which is spaced from but in line with the first drive wheel 40. The front or first drive wheel 40 cooperates with the first drive mechanism 44. The first drive mechanism 44 extends between the first drive wheel 40 and a front or first drive motor 46. The first drive motor 46 may be, but is not limited to, a servo motor. A back or second drive mechanism 48 cooperates with the second drive wheel 42. The back or second drive mechanism 48 extends between the second drive wheel 42 and a back or second drive motor 50. The second drive motor 50 may be, but is not limited to, a servo motor. A scrap tube 52 extends from the back of the cable preparation apparatus 10.

The first and second drive motors 46, 50 can run at a reduced current, which reduces their output torque. This torque can be adjusted such that the braid cutting wheel 30 and the insulation cutting blade 32 do not damage the mandrel when the braid cutting wheel 30 and the insulation cutting blade 32 are moved into engagement with the mandrel 34. The drive motors 46, 50 have integral encoders 54 (FIG. 3) which monitor the position of the braid cutting wheel 30 and/or the insulation cutting blade 32. One or more controllers 56 are provided in the cable preparation apparatus 10. The controllers 56 monitor the current supplied to the motors 46, 50 and the positioned provided by the encoders 54. By monitoring these two factors, the cable preparation apparatus 10 can determine when the braid cutting wheel 30 and/or the insulation cutting blade 32 have stopped advancing. The motors, through the controllers 56 can drive the braid cutting wheel 30 and/or the insulation cutting blade 32 until they encounter the mandrel.

Figure 4:
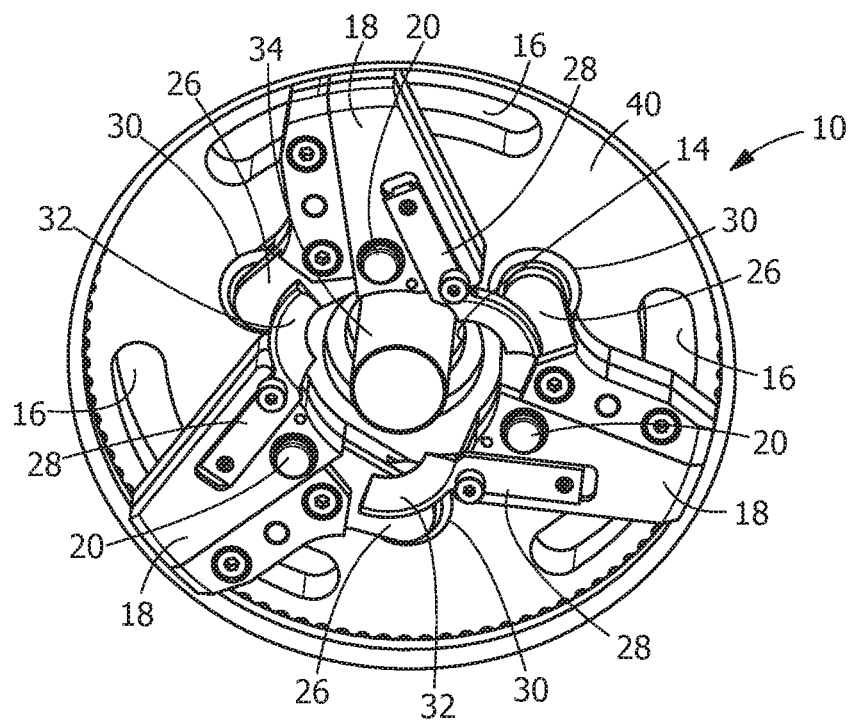
FIG. 4 is a front diagrammatic view of a mandrel inserted between blades of the cable preparation apparatus.

The cable preparation apparatus 10 can be used to perform a tool verification process, to verify that the proper tools have been installed prior to running the apparatus 10 with a cable inserted therein. During this process, the reference device or mandrel 34 is inserted from the back of the cable preparation apparatus 10 through the opening 14 in the blade control mechanism 12. The measurements of the reference mandrel 34 are preprogramed and stored in the controller 56 based on the information of the mandrel 34 that the user or operator has entered. The insertion of the mandrel 12 continues until the front portion of the mandrel 34 is positioned between the mounting portions 26, 28 of the blade control arms 18, as shown in FIGS. 1 and 4. The mandrel 34 is selected such that the diameter of the mandrel 34 is a known diameter used in the processing of the cable. In different embodiments, the diameter of the mandrel 34 may vary according to the cable size.

Figure 5:
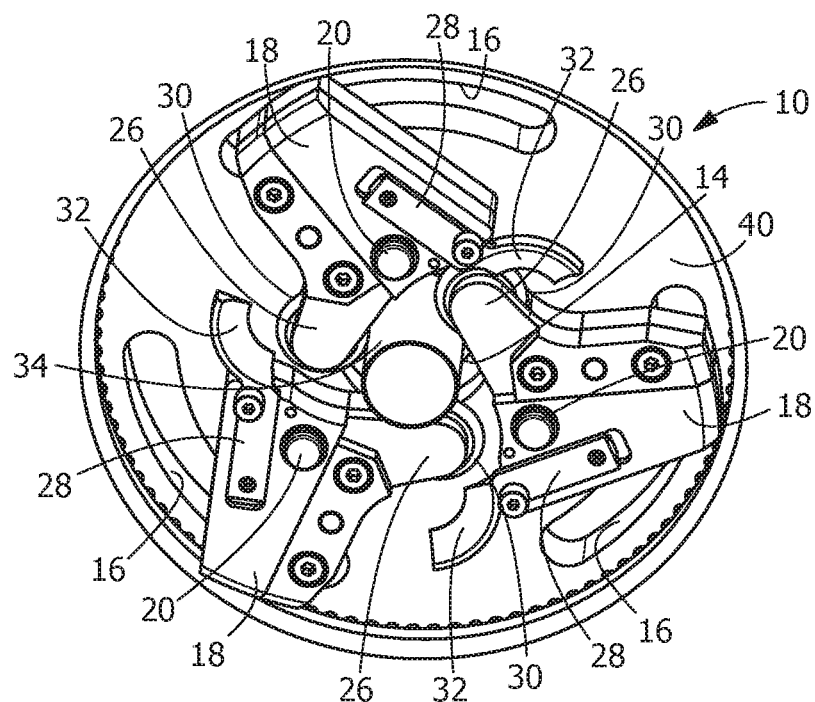
FIG. 5 is a front diagrammatic view of braid cutting wheels positioned in engagement with the mandrel.

With the mandrel 34 properly positioned, the braid cutting wheels 30 are moved inward toward the mandrel 34 under low torque until the braid cutting wheels 30 contact the mandrel 34, as shown in FIG. 5. Low torque is defined as a torque which is able to move the braid cutting wheels 30 toward the mandrel 34 at a speed or force which will not damage the mandrel 34 when the braid cutting wheels 30 contact the mandrel 34. As the braid cutting wheels 30 contact the mandrel 34, the current needed to move the braid cutting wheels 30 is increased. The current data is sent to the controller 56, allowing the controller 56 to recognize that the braid cutting wheels 30 have contacted the mandrel 34. As this occurs the torque applied to the braid cutting wheels 30 is stopped or reduced. In this position, the encoders 54 send the position data of the braid cutting wheels 30 to the controller 56. If the current data and/or position data of the braid cutting wheels 30 matches the expected diameter of a range of diameters of the reference mandrel 34, the cable preparation apparatus 10 proceeds to the next step. If the current data and/or position data of the braid cutting wheels 30 do not match or conform to the range of diameters of the mandrel 34, the tooling is not validated, and the apparatus 10 alerts the user the user or operator, such as by an error message displayed to the user or operator. Either the current data, the position data or both may be used to determine if the braid cutting wheels 30 have encountered the mandrel 34.

Figure 6:
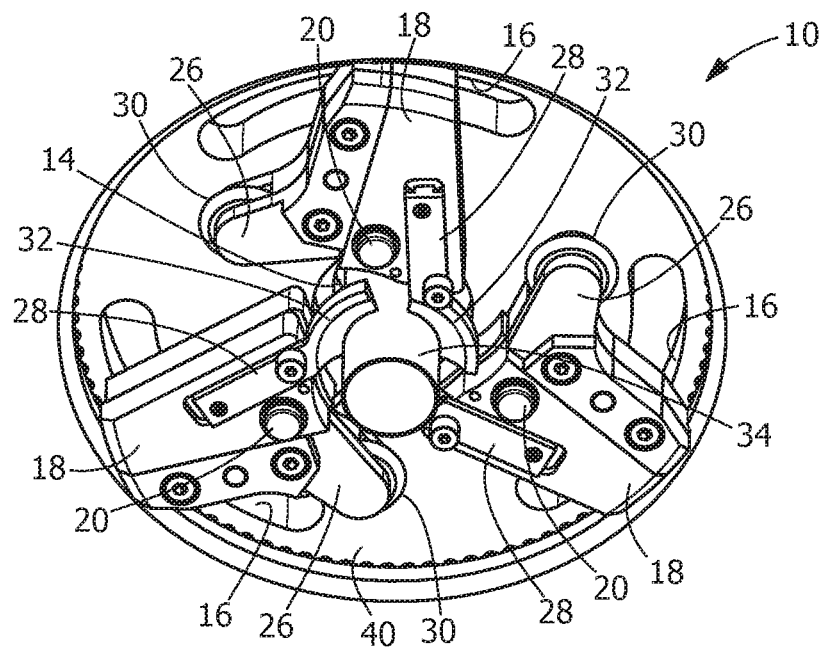
FIG. 6 is a front diagrammatic view of insulation cutting blades positioned in engagement with the mandrel.

If the position of the braid cutting wheels 30 matches the diameter of the mandrel 34, the insulation cutting blades 32 are moved inward toward the mandrel 34 under low torque until the insulation cutting blades 32 contact the mandrel 34, as shown in FIG. 6. Low torque is defined as a torque which is able to move the insulation cutting blades 32 toward the mandrel 34 at a speed or force which will not damage the mandrel 34 when the insulation cutting blades 32 contact the mandrel 34. As the insulation cutting blades 32 contact the mandrel 34, the current needed to move the insulation cutting blades 32 is increased. The current data is sent to the controller 56, allowing the controller 56 to recognize that the insulation cutting blades 32 have contacted the mandrel 34. As this occurs the torque applied to the insulation cutting blades 32 is stopped or reduced. In this position, the encoders 54 send the position data of the insulation cutting blades 32 to the controller 56. If the current data and/or position data of the insulation cutting blades 32 matches the expected range of diameters of the reference mandrel 34, the cable preparation apparatus 10 proceeds to the next step. If the current data and/or position data of the insulation cutting blades 32 do not match or conform to the range of diameters of the mandrel 34, the tooling is not validated, and the apparatus 10 alerts the user the user or operator, such as by an error message displayed to the user or operator. Either the current data, the position data or both may be used to determine if the insulation cutting blades 32 have encountered the mandrel 34.

If the position of the insulation cutting blades 32 matches the diameter of the mandrel 34, the blade control arms 18, including the braid cutting wheels 30 and the braid cutting wheels 30 are returned to their home positions and the mandrel 34 is retracted back through the opening 14 of the blade control mechanism 12. The tooling has been verified and the cable preparation apparatus 10 is ready for use.

In addition to the tool verification process described above, the cable preparation apparatus 10 can be used to perform a tool calibration process, to properly locate and position the tooling during cable preparation to facilitate the proper preparation of the cable. In some embodiments, the tool calibration process can be done either during the tool verification process, after the tool verification process, or independent of the tool verification process.

During this process, the mandrel 34 is inserted from the back of the cable preparation apparatus 10 through the opening 14 in the blade control mechanism 12. The insertion of the mandrel 34 continues until the front portion of the mandrel 34 is positioned between the mounting portions 26, 28 of the blade control arms 18, as shown in FIGS. 1 and 4. The mandrel 34 is selected such that the diameter of the mandrel 34 is a known diameter used in the processing of the cable. In different embodiments, the diameter of the mandrel 34 may vary according to the cable size.

With the mandrel 34 properly positioned, the braid cutting wheels 30 are moved inward toward the mandrel 34 under low torque, as previously defined, until the braid cutting wheels 30 contact the mandrel 34, as shown in FIG. 5. As the braid cutting wheels 30 contact the mandrel 34, the current needed to move the braid cutting wheels 30 is increased. The current data is sent to the controller 56, allowing the controller 56 to recognize that the braid cutting wheels 30 have contacted the mandrel 34. As this occurs the torque applied to the braid cutting wheels 30 is stopped or reduced. In this position, the encoders 54 send the position data of the braid cutting wheels 30 to the controller 56. The position data is recorded by the controller 56. The braid cutting wheels 30 are then retracted to a safe distance from the mandrel 34 to allow the braid cutting wheels 30 to be rotated relative to the mandrel 34.

The blade control mechanism 12 of the cable preparation apparatus 10 is rotated by the second drive wheel 48 and the second motor 50 to position the braid cutting wheels 30 over a different location on the circumference of the mandrel 34. The braid cutting wheels 30 are again moved inward toward the mandrel 34 under low torque until the braid cutting wheels 30 contact the mandrel 34. As the braid cutting wheels 30 contact the mandrel 34, the current needed to move the braid cutting wheels 30 is increased. The current data is sent to the controller 56, allowing the controller 56 to recognize that the braid cutting wheels 30 have contacted the mandrel 34. As this occurs the torque applied to the braid cutting wheels 30 is stopped or reduced. In this position, the encoders 54 send the position of the braid cutting wheels 30 to the controller 56. The position is recorded by the controller 56.

The process is repeated a number of times. The positions are recorded by the controller 56 and an average is calculated. This provides an accurate calibration factor for the braid cutting wheels 30. The controller 56 will use the average position where the braid cutting wheels 30 stopped advancing to create a custom offset that will calibrate the braid cutting wheels 30. Although the process is described with calculating an average of the positions of the braid cutting wheels 30, in various embodiments, the braid cutting wheels 30 may be calibrated by recording only one position of the braid cutting wheels 30, or several positions of the braid cutting wheels 30 along the length of the mandrel 34.

With the mandrel 34 properly positioned, the insulation cutting blades 32 are moved inward toward the mandrel 34 under low torque, as previously defined, until the insulation cutting blades 32 contact the mandrel 34, as shown in FIG. 6. As the insulation cutting blades 32 contact the mandrel 34, the current needed to move the insulation cutting blades 32 is increased, allowing the controller 56 to recognize that the insulation cutting blades 32 have contacted the mandrel 34. As this occurs the torque applied to the insulation cutting blades 32 is stopped or reduced. In this position, the encoders 54 send the position of the insulation cutting blades 32 to the controller 56. The position is recorded by the controller 56. The insulation cutting blades 32 are then retracted to a safe distance from the mandrel 34 to allow the insulation cutting blades 32 to be rotated relative to the mandrel 34.

The blade control mechanism 12 of the cable preparation apparatus 10 is rotated by the second drive wheel 48 and the second motor 50 to position the insulation cutting blades 32 over a different location on the circumference of the mandrel 34. The insulation cutting blades 32 are again moved inward toward the mandrel 34 under low torque until the insulation cutting blades 32 contact the mandrel 34. As the insulation cutting blades 32 contact the mandrel 34, the current needed to move the insulation cutting blades 32 is increased, allowing the controller 56 to recognize that the insulation cutting blades 32 have contacted the mandrel 34. As this occurs the torque applied to the insulation cutting blades 32 is stopped or reduced. In this position, the encoders 54 send the position of the insulation cutting blades 32 to the controller 56. The position is recorded by the controller 56.

The process is repeated a number of times. The positions are recorded by the controller 56 and an average is calculated. This provides an accurate calibration factor for the insulation cutting blades 32. The controller 56 will use the average position where the insulation cutting blades 32 stopped advancing to create a custom offset that will calibrate the insulation cutting blades 32. Although the process is described with calculating an average of the positions of the insulation cutting blades 32, in various embodiments, the insulation cutting blades 32 may be calibrated by recording only one position of the insulation cutting blades 32, or several positions of the braid cutting wheels 30 along the length of the mandrel 34.

After calibration, the blade control arms 18, including the braid cutting wheels 30 and the braid cutting wheels 30 are returned to their home positions and the mandrel 34 is retracted back through the opening 14 of the blade control mechanism 12. The controller 56 is able to control the position of the braid cutting wheels 30 and the insulation cutting blades 32 very precisely. This calibration also allows machine sequences to be sent to other machines, and they will perform with similar performance.

As previously stated, the tool verification and calibration processes can be performed at different times or at the same time. For example, the first touch of the braid cutting wheels 30 or insulation cutting blades 32 on the mandrel 34 can also verify proper installation of the tooling.

Figure 7:
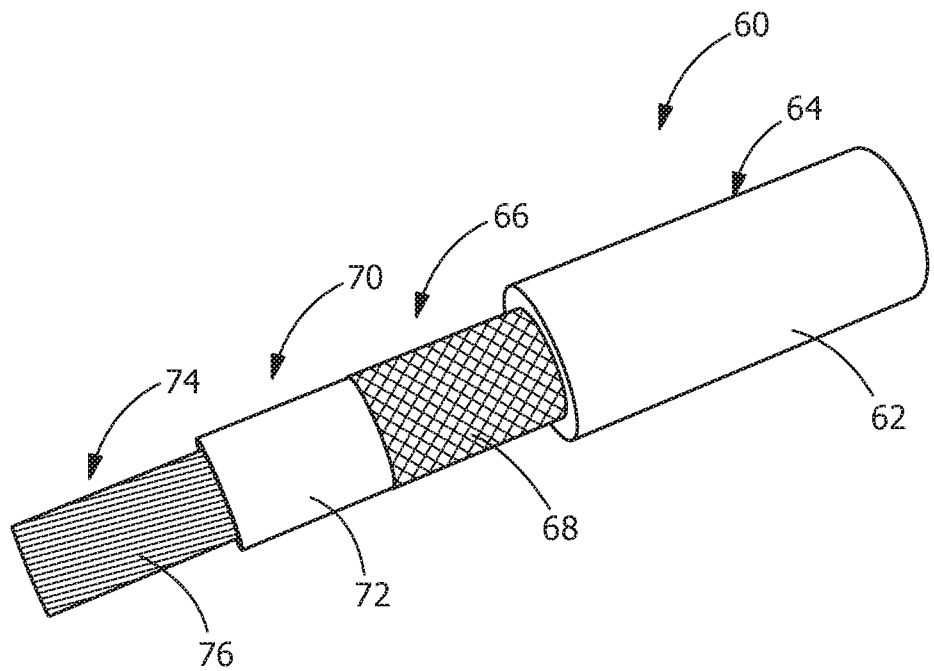
FIG. 7 is a perspective view of an illustrative cable in a post-stripped condition.
Figure 8:
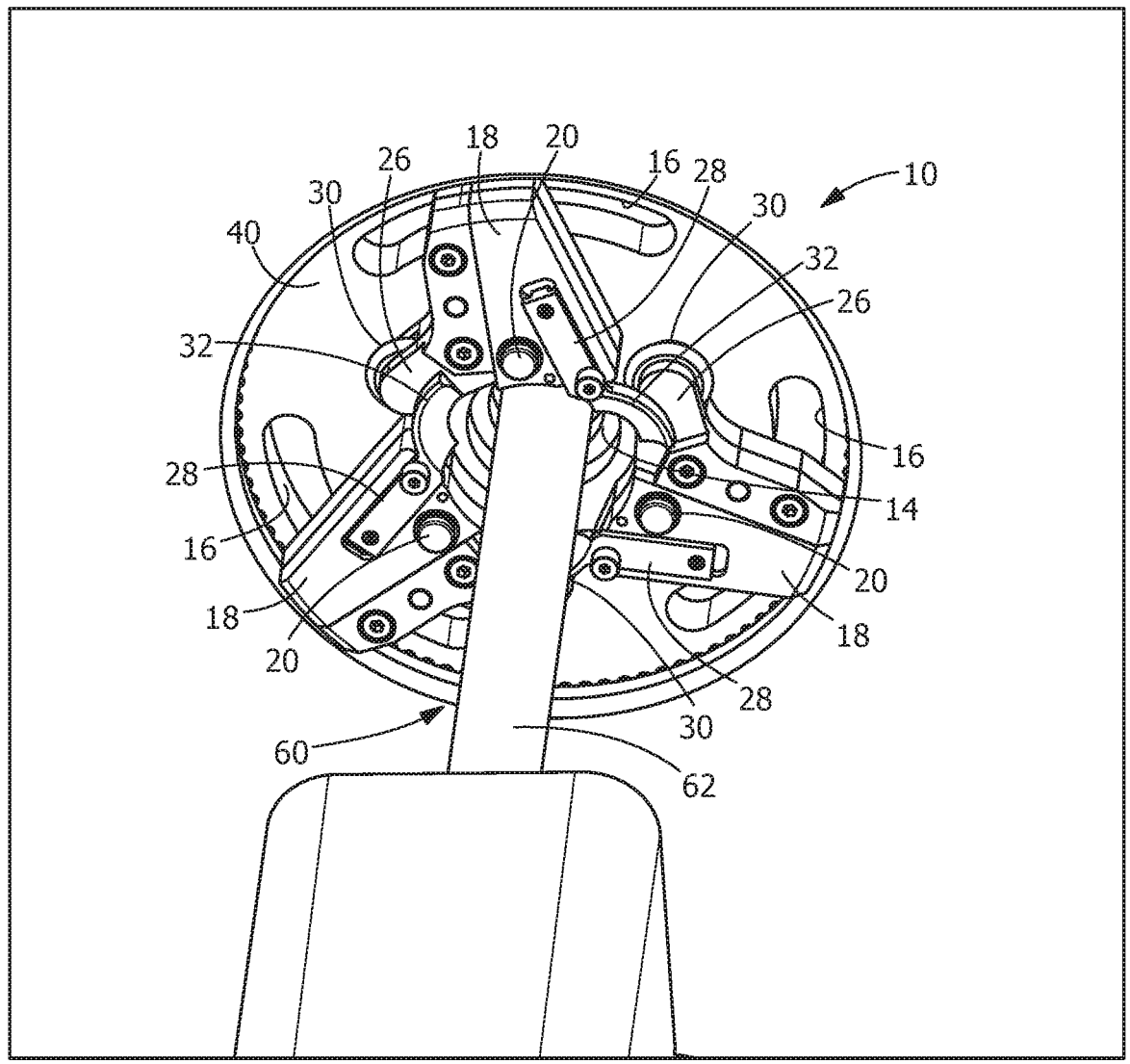
FIG. 8 is diagrammatic view a cable secured and positioned in the cable preparation apparatus.

With the tooling properly verified and calibrated, a cable learning process may be used to program the controller 56 to properly prepare the cable. In this process, a cable 60 is prepared as shown in FIG. 7. The prepared cable is in a post-stripped condition, with the outer insulation jacket 62 and foil intact at a first portion 64 of the cable 60, the outer insulation jacket 62 and foil removed at a second portion 66 of the cable 60, the braid 68 cut and removed at a third portion 70 of the cable 60, and the inner insulation 72 removed at a fourth portion 74 of the cable 60 to expose the inner conductor 76.

The cable 60 is placed into the cable preparation apparatus 10 and the cable learning sequence or process is begun. Cable clamps (not shown) of the cable preparation apparatus 10 grip the cable 60 and move the cable 60 between the blade control arms 18. Initially the cable 60 is positioned such that the outer insulation jacket 62 at the first portion 64 of the cable 60 is between the insulation cutting blades 32. The insulation cutting blades 32 are then closed on the outer insulation jacket 62 under low torque until the insulation cutting blades 32 contact the outer insulation jacket 62, in a manner similar to that described above. Low torque is defined as a torque which is able to move the insulation cutting blades 32 toward the cable 60 at a speed or force which will not damage the cable when the insulation cutting blades 32 contact the cable 60. The controlled torque will allow the insulation cutting blades 32 to contact the outer insulation jacket 62 of the cable 60 without cutting it. The position is recorded by the controller 56 as the cable outer diameter.

The insulation cutting blades 32 are reversed and moved away from the cable 60. With the insulation cutting blades 32 removed, the cable 60 is retracted such that the second portion 66 of the cable 60 with the braid 68 exposed is positioned between the insulation cutting blades 32. The insulation cutting blades 32 are then closed on the braid 68 under low torque until the insulation cutting blades 32 contact the braid 68, in a manner similar to that described above. The controlled torque will allow the insulation cutting blades 32 to contact the braid 68 of the cable 60 without cutting it. The position is recorded by the controller 56 as the braid diameter.

The insulation cutting blades 32 are reversed and moved away from the cable 60. With the insulation cutting blades 32 removed, the cable 60 is retracted such that the third portion 70 of the cable 60 with the inner insulation 72 exposed is positioned between the insulation cutting blades 32. The insulation cutting blades 32 are then closed on the inner insulation 72 under low torque until the insulation cutting blades 32 contact the inner insulation 72, in a manner similar to that described above. The controlled torque will allow the insulation cutting blades 32 to contact the inner insulation 72 of the cable 60 without cutting it. The position is recorded by the controller 56 as the inner insulation diameter.

The insulation cutting blades 32 are reversed and moved away from the cable 60. With the insulation cutting blades 32 removed, the cable 60 is retracted such that the fourth portion 74 of the cable 60 with the conductor 76 exposed is positioned between the insulation cutting blades 32. The insulation cutting blades 32 are then closed on the conductor 76 under low torque until the insulation cutting blades 32 contact the conductor 76, in a manner similar to that described above. The controlled torque will allow the insulation cutting blades 32 to contact the conductor 76 of the cable 60 without cutting it. The position is recorded by the controller 56 as the conductor diameter.

With the measured diameters, the cable preparation apparatus 10 can determine if the installed tooling is capable of preparing the cable 60 and, if so, create an appropriate cable preparation sequence.

In various embodiments, the cable preparation apparatus 10 may be equipped with a "through-beam" sensor located in the scrap tube 52 (FIG. 3) to detect proper scrap removal from the cable. This sensor could also be used to detect the presence of the mandrel 34. Additionally, the sensor could be used to identify exactly which mandrel 34 is installed. If each unique mandrel size has a unique length, the sensor could identify the mandrel 34 by noting when it breaks the through-beam as it is being moved forward.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A method to verify that proper tooling has been installed in a cable preparation apparatus prior to running the cable preparation apparatus with a cable inserted therein, the method comprising:
   inserting a reference device between braid cutting wheels and insulation cutting blades of the cable preparation device;
   moving the braid cutting wheels inward toward the reference device until the braid cutting wheels engage the reference device;
   monitoring the current needed to move the braid cutting wheels to determine when the braid cutting wheels engage the reference device;

moving the insulation cutting blades inward toward the reference device until the insulation cutting blades engage the reference device;

monitoring the current needed to move the insulation cutting blades to determine when the insulation cutting blades engage the reference device;

collecting data to determine when the blades engage the reference device; and comparing the collected data of the blades to an expected range of data of the reference device to verify that the proper tooling has been installed in the cable preparation apparatus.

2. The method as recited in claim 1, wherein if the collected data of the braid cutting wheels and the insulation cutting blades does not conform to the expected range of data of the reference device the tooling is not validated, and the apparatus alerts the user.

3. The method as recited in claim 1, wherein the reference device is a mandrel which has a known diameter.

4. The method as recited in claim 1, comprising:
inserting the mandrel through an opening in a blade control mechanism of the cable preparation apparatus.

5. The method as recited in claim 4, wherein the braid cutting wheels and the insulation cutting blades are mounted on blade control arms which are mounted on the blade control mechanism of the cable preparation apparatus.

6. The method as recited in claim 1, wherein as the braid cutting wheels and the insulation cutting blades contact the reference device, the current needed to move the braid cutting wheels and the insulation cutting blades is increased, allowing a controller of the cable preparation apparatus to recognize that the braid cutting wheels and the insulation cutting blades have contacted the reference device.

7. The method as recited in claim 1, wherein as the braid cutting wheels and the insulation cutting blades contact the reference device, the encoders of the cable preparation apparatus send position data to a controller of the cable preparation apparatus.

8. The method as recited in claim 1, comprising:
moving the braid cutting wheels and the insulation cutting blades under low torque toward the reference device until the braid cutting wheels and the insulation cutting blades engage the reference device.

9. A method to calibrate the positioning of tooling in a cable preparation apparatus prior to running the cable preparation apparatus with a cable inserted therein, the method comprising:

i) inserting a reference device between braid cutting wheels and insulation cutting blades of the cable preparation device;

ii) moving the braid cutting wheels inward toward the reference device until the braid cutting wheels engage the reference device;

iii) collecting data to determine when the braid cutting wheels engage the reference device;

iv) moving the braid cutting wheels away from the reference device;

v) moving the insulation cutting blades inward toward the reference device until the insulation cutting blades engage the reference device;

vi) collecting data to determine when the insulation cutting blades engage the reference device;

vii) moving the insulation cutting blades away from the reference device;

viii) repeating steps ii) through vii) at least once;

ix) averaging the data collected; and x) recording the average collected data to calibrate the braid cutting wheels and the insulation cutting blades.

10. The method as recited in claim 9, wherein the reference device is a mandrel which has a known diameter.

11. The method as recited in claim 10, wherein the braid cutting wheels and the insulation cutting blades are mounted on blade control arms which are mounted on a blade control mechanism of the cable preparation apparatus.

12. The method as recited in claim 9, comprising:
monitoring the current on motors which drive the braid cutting wheels and the insulation cutting blades to detect when the braid cutting wheels and the insulation cutting blades have encountered an object.

13. The method as recited in claim 9, comprising:
monitoring the position of the braid cutting wheels and the insulation cutting blades with encoders.

14. The method as recited in claim 9, comprising:
monitoring the current on motors which drive the braid cutting wheels and the insulation cutting blades to detect when the braid cutting wheels and the insulation cutting blades have encountered an object; and
monitoring the position of the braid cutting wheels and the insulation cutting blades with encoders.

15. The method as recited in claim 9, comprising:
moving the braid cutting wheels and the insulation cutting blades under low torque toward the reference device until the braid cutting wheels and the insulation cutting blades engage the reference device.

\* \* \* \* \*